United States Patent
Kimura et al.

[15] 3,697,540
[45] Oct. 10, 1972

[54] CHROMENOPYRAZOL AND PROCESS FOR PREPARATION THEREOF

[72] Inventors: Shiro Kimura; Sadao Ishige; Teruo Kobayashi, all of Kanagawa, Japan

[73] Assignee: Fuji Photo Film Co., Ltd., Kanagawa, Japan

[22] Filed: Sept. 16, 1969

[21] Appl. No.: 858,522

[30] Foreign Application Priority Data

Sept. 16, 1968 Japan.....................43/66822

[52] U.S. Cl...........260/310 R, 117/36.8, 260/310 A, 260/519
[51] Int. Cl......................................C07d 49/18
[58] Field of Search..................260/310 R

[56] References Cited

FOREIGN PATENTS OR APPLICATIONS

43/11,244  6/1965  Japan.....................260/310 R

OTHER PUBLICATIONS

Beilstein Handbuch der Organischen Chemie 4th ed., 1st Supplement, Vols. 26–7, pages 666–7. Berlin, Springer, 1938. QD251.B4

Lagidze et al. Chem. Abst. Vol. 68, No. 68768r (1968). QD1.A51

Patterson et al. The Ring Index 2nd ed. page 757 (No. 5485) Wash., D.C., Amer. Chem. Soc., 1960. QD291.P3.

Chemical Abstracts Vol. 72, Subject Index, P–Z, page 3,558 s (1970) QD1.A51

Primary Examiner—Natalie Trousof
Attorney—Sughrue, Rothwell, Mion, Zinn & Macpeak

[57] ABSTRACT

Chromenopyrazol compounds having the formula

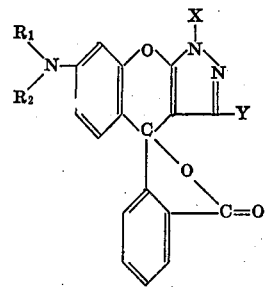

and a process for their preparation are disclosed. The chromenopyrazol compounds are useful as couplers in pressure-sensitive duplicating papers.

11 Claims, No Drawings

CHROMENOPYRAZOL AND PROCESS FOR PREPARATION THEREOF

DESCRIPTION OF THE INVENTION

The present invention relates to a process for preparing a novel chromenopyrazol compound and a process for the preparation thereof.

More specifically, the present invention relates to a novel lactone compound of chromenopyrazol having the following Formula (III)

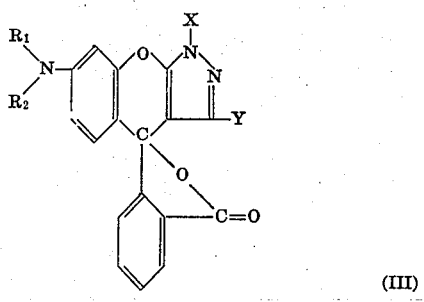

(III)

wherein each $R_1$ and $R_2$ is selected from the group consisting of an alkyl group having from one to five carbon atoms, and a benzyl group, wherein X is selected from the group consisting of an alkyl group having from one to five carbon atoms, an aryl group and a substituted aryl group, and wherein Y is selected from the group consisting of an alkyl group having one to 17 carbon atoms, an aryl group, substituted aryl group, an amino group, an acylamino group, a carbamoyl group and an alkoxy group having from one to five carbon atoms. This invention also relates to a process for the preparation thereof by condensing a 2-(4'-N,N-disubstituted amino-2'-hydroxybenzoyl) benzoic acid having the Formula (I),

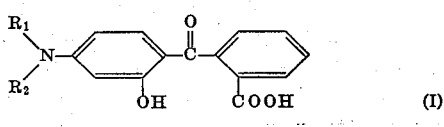

(I)

with a 1-substituted-3-substituted-5-pyrazolone derivative having the Formula (II),

(II)

wherein $R_1$, $R_2$, X and Y are as described above.

The aryl group represented by X or Y in above Formulae (II) and (III) can be an unsubstituted phenyl or naphthyl group or a substituted phenyl or naphthyl group with the substitution being by group other than a hydrogen ion-isolating group, such as a sulfo group, a carboxyl group, a hydroxyl group, and the like. For example, suitable substituted phenyl or naphthyl groups are those substituted by an alkyl group, a halogen atom, an alkoxyl group, an acetoxyl group, an amino group, an acylamino group, an acyl group, or a nitro group.

The term chromenopyrazol as used in the present invention describes a compound represented by the formula,

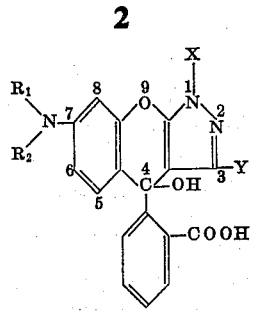

wherein $R_1$, $R_2$, X and Y are as described above.

The compounds, represented by the Formula I, suitable for use in the process described herein, are exemplified by 2-(4'-N,N-diethylamino-2'-hydroxybenzoyl)benzoic acid, 2-(4'-N,N-dimethylamino-2'-hydroxybenzoyl)benzoic acid, 2(4'-N,N-diamylamino-2'-hydroxybenzoyl)benzoic acid, 2-(4'-N-benzyl-N-methylamino-2'-hydroxybenzoyl)benzoic acid, and the like. These compounds can be prepared by heating phthalic anhydride and the corresponding m-aminophenol derivatives in toluene according to the method described in Friedlander, "Fortschritte der Teerfarbenfarbikation und Verwandter Industriezwiege" Vol.IV, p.260 wherein German Pat. Specification No. 85,931 is abstracted. In said specification it is revealed that by heating phthalic anhydride and m-aminophenol derivative in toluene, benzene, or xylene to boiling for about 8–10 hours, cooling, and recovering the precipitate which is then recrystallized. The phthalic anhydride and dislkyl-m-aminophenol derivatives are present in approximately equal weight amounts and sufficient solvent is used in order to effect a complete dissolution.

The compound represented by the Formula II

(II)

can be represented also by the formula (IIa) shown as follows:

(IIa)

as a tautomer. The compounds represented by the formula II, suitable for use in the process described herein are exemplified by 3-methyl-1-phenylpyrazolone, 3-methyl-1-(p-tolyl)pyrazolone, 3-methyl-1-(2',4',6'-trichlorophenyl)pyrazolone, 3-ethoxy-1-(2',4',6'-trichlorophenyl)pyrazolone, 1,3-diphenylpyrazolone, 3-amino-1-phenylpyrazolone, 3-(p-chlorobenzoyl) amino-1-phenylpyrazolone, 1,3-dimethylpyrazolone, 3-heptadecyl-1-(p-phenoxyphenyl)pyrazolone, 3-(m-nitrophenyl)-1-phenylpyrazolone, 3-methyl-1(2',6'-dichloro-4'-methoxyphenyl)pyrazolone, 3-(m-nitrophenylcarbamoyl)amino-1-(2', 6'-dichloro-4'-methoxyphenyl pyrazolone, and the like. These compounds are all known compounds.

The process of the present invention is carried out by reacting the above two materials in a condensation and dehydration reaction. That is, equal molar amounts of the compound represented by Formula (I) and the compound represented by Formula (II) are condensed in a condensation reaction medium, such as sulfuric acid of above 60 percent in concentration, at 30° to 100° C. for from 1 to 24 hours. Suitable as condensation reaction media are also phosphoric anhydride, polyphosphoric acid, anhydrous zinc chloride, phosphorous oxychloride, fuming sulfuric acid, in combination with sulfuric acid. Sulfuric acid is preferred as the condensation reaction medium. The reaction medium containing the condensation product of compound (I) and compound (II) is poured into a large amount of ice water, to precipitate the product, the precipitated product is filtered, and treated with an aqueous alkaline solution to obtain the compound of the Formula (III) as a colorless crystal.

That the compound obtained by the process described above has a molecular structure represented by the Formula (III) was confirmed by means of an infrared absorption spectrum and elemental analysis. That is, with these compounds, the characteristic absorption of carbonyl group in the lactone ring is near 1,755 cm.$^{-1}$ with the characteristic absorptions of carboxyl group and hydroxyl group in the Formula (I) and Formula (II) not being observed. (However, in the compounds prepared in Examples 9 and 13, the characteristic absorption of the carbonyl group in the amide group was observed.) The results of elemental analysis was identical with the theoretical value.

The lactam of chromenopyrazole prepared as above and represented by the above Formula (III) is a novel compound. It is useful as a coupler for use in pressure-sensitive duplicating papers, heat-sensitive duplicating papers, coupler inks and the like, because, the lactone of chromenopyrazole, a colorless compound, develops a yellowish-orange to reddish-orange color on contact with a solid acid, an organic acid, or phenols.

EXAMPLE I

Preparation of the Lactone of 7-N,N-dimethylamino-4-(0-carboxyphenyl)-4-hydroxy-1-phenyl-3-methyl-1,4-dihydrochromeno [2,3-C] pyrazol

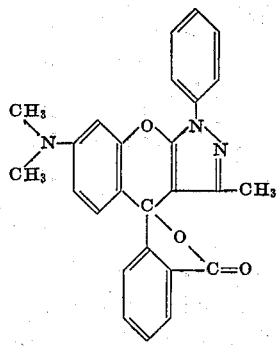

14.3 g. (1/20 mole) of 2-(4'-N,N-dimethylamino-2'-hydroxybenzoyl)benzoic acid and 8.7 g. (1/20 mole) of 3-methyl-1-phenyl-5-pyrazolone were dissolved in 72 g. of 94 to 96 percent concentrated sulfuric acid at a temperature of below 45° C., thereafter heated to a temperature of 90° ± 2° C. for 3 hours, and cooled to ambient temperature. The reaction solution was poured into 800 g. of ice water and the precipitate was filtered. This precipitate was extracted with 600 ml. of chloroform while neutralizing with an aqueous solution of caustic soda. The chloroform solution was washed with water several times and concentrated under reduced pressure to obtain the desired product as a colorless crystal.

Melting point, 296°–298° C.; Yield 14.6 g.
Elemental analysis for $C_{26}H_{21}N_3O_3$:
Found: C 73.41; H 4.93; N 9.80
Calculated: C 73.74; H 5.00; N 9.92.

The product was adsorbed on acid clay and developed a yellowish-orange color.

EXAMPLE II

Preparation of the Lactone of 7-N,N-diethylamino-4-(0-carboxyphenyl)-4-hydroxy-1-phenyl-3-methyl-11,4-dihydrochromeno [2,3-C] pyrazol.

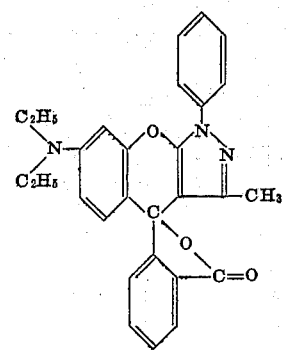

15.7 g. (1/20 mole) of 2-(4'-N,N-diethylamino-2'-hydroxybenzoyl)benzoic acid and 8.7 g. (1/20 mole) of 3-methyl-1-phenyl-5-pyrazolone were reacted (at 50° C. for 20 hours) and treated as in Example 1 to obtain 19.5 g. of a colorless crystal melting at 260°–261° C.

Elemental analysis for $C_{28}H_{25}N_3O_3$:
Found: C 74.23; H 5.57; N 9.37
Calculated: C 74.48; H 5.58; N 9.31. 0

The product was adsorbed on acid clay and developed a yellowish-orange color.

EXAMPLE III

Preparation of the Lactone of 7-N-benzyl-N-ethylamino-4-(o-carboxyphenyl)-4-hydroxy-1-phenyl-3-methyl-1,4-dihydrochromeno [2,3-C] pyrazol.

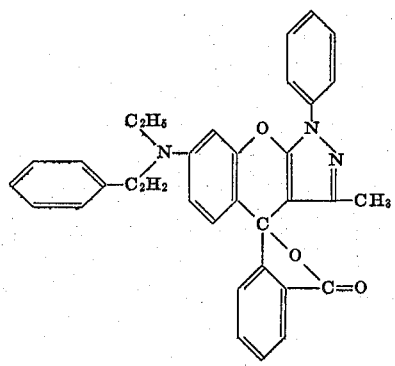

18.8 g. (1/20 mole) of 2-(4'-N-benzyl-N-ethylamino-2'-hydroxybenzoyl) benzoic acid and 8.7 g. (1/20 mole) of 3-methyl-1-phenyl-5-pyrazolone were dissolved in 55 g. of 98 percent sulfuric acid at a temperature of below 40°C. 5 g. of phosphoric anhydride were added and the mixture heated to 60° C. for 4 hours, the procedure of Example 1 was then followed and 21.4 g. of a colorless crystal melting at 198°–202° C. was obtained.

Elemental analysis for $C_{32}H_{25}N_3O_3$:
Found: C 77.21; H 5.18; N 8.64
Calculated: C 76.93; H 5.04; N 8.41.

The product was adsorbed on acid clay and developed an orange color. Experiments IV–XIII The chromenopyrazol compounds in the following table, and represented by Formula (III) above, prepared by condensing a benzoic acid derivative of the Formula (I), having the $R_1$ and $R_2$ groups as shown in columns 2 and 3, with a pyrazolone of the Formula (II) having the X and Y substituents as shown in columns 4 and 5, according to the procedure described in Example 1. Analysis obtained on the chromenopyrazole compounds prepared are shown in column 6.

| Example number | $R_1$ | $R_2$ | X | Y | Characteristics |
|---|---|---|---|---|---|
| 4 | $C_2H_5$ | $C_2H_5$ | $CH_3$ | $CH_3$ | M.P.: 186–187° C. Analysis for $C_{29}H_{27}N_3O_3$: Found—C, 74.68; H, 5.78; N, 9.10, Calculated—C, 74.82; H, 5.85; N, 9.03, Developed color tone: Yellowish-orange. |
| 4 (X structure) | | |  | | |
| 5 | $C_2H_5$ | $C_2H_5$ | (trichlorophenyl, see below) | $CH_3$ | M.P.: 213–214° C. Analysis for $C_{29}H_{22}Cl_3N_3O_3$: Found—C, 60.70; H, 4.06; N, 7.68; Cl, 18.98. Calculated—C, 60.61; H, 4.00; N, 7.57; Cl, 19.17. Developed color tone: Yellowish-orange. |
| 5 (X structure) | | | 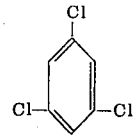 | | |
| 6 | $C_2H_5$ | $C_2H_5$ | Same as above | $OC_2H_5$ | M.P.: 178–180° C. Analysis for $C_{29}H_{24}Cl_3N_3O_3$: Found—C, 59.48; H, 4.06; N, 7.26; Cl, 18.07. Calculated—C, 59.55; H, 4.13; N, 7.18; Cl, 18.18. Developed color tone: Yellowish-orange. |
| 7 | $C_2H_5$ | $C_2H_5$ | 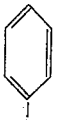 | (phenyl) | M.P.: 205° C. Analysis for $C_{33}H_{27}N_3O_3$: Found—C, 77.14; H, 5.26; N, 8.27, Calculated—C, 77.17; H, 5.30; N, 8.18. Developed color tone: Orange. |
| 8 | $C_2H_5$ | $C_2H_5$ | Same as above | $NH_2$ | M.P.: 265–267° C. Analysis for $C_{27}H_{24}N_4O_3$: Found—C, 71.48; H, 5.40; N, 12.47, Calculated—C, 71.66; H, 5.35; N, 12.38. Developed color tone: Yellowish-red. |
| 9 | $C_2H_5$ | $C_2H_5$ | do | $-NH-C(=O)-C_6H_4-Cl$ | M.P.: 264–266° C. Analysis for $C_{34}H_{27}ClN_4O_4$: Found—C, 68.88; H, 4.49; N, 9.63; Cl, 5.89. Calculated—C, 69.09; H, 4.60; N, 9.48; Cl, 6.00. Developed color tone: Reddish-orange. |
| 9 (Y structure) | | | |  | |
| 10 | $C_2H_5$ | $C_2H_5$ | $CH_3$ | $CH_3$ | Recrystallized from a benzene-ether mixed solvent. M.P.: 177–178° C. Analysis for $C_{23}H_{23}N_3O_3$: Found—C, 70.81; H, 6.01; N, 10.77. Calculated—C, 70.93; H, 5.95; N, 10.79. Developed color tone: Yellowish-orange. |
| 11 | $C_2H_5$ | $C_2H_5$ | (phenoxyphenyl) | $C_{17}H_{35}$ª | Colorless syrup. Analysis for $C_{50}H_{61}N_3O_4$: Found—C, 78.06; H, 7.89; N, 5.41. Calculated—C, 78.24; H, 7.95; N, 5.48. Developed color tone: Orange. $\lambda_{max}$ of coupler solution in 95% acetic acid: 505 mμ and 485 mμ. |
| 11 (X structure) | | | 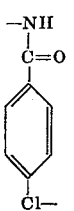 | | |
| 12 | $CH_3$ | $CH_3$ | 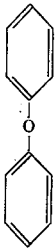 |  | M.P.: Above 300° C. Analysis for $C_{31}H_{22}N_4O_5$: Found—C, 69.97; H, 4.23; N, 10.51. Calculated—C, 70.18; H, 4.18; N, 10.56. Developed color tone: Yellowish-orange. |

| Example number | $R_1$ | $R_2$ | X | Y | Characteristics |
|---|---|---|---|---|---|
| 13 | $C_2H_5$ | $C_2H_5$ | 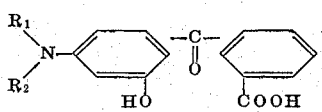 | 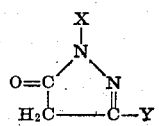 | M.P.: 287–290° C.<br>Analysis for $C_{35}H_{25}Cl_2N_6O_7$: Found—C, 58.82; H, 3.98; N, 11.67. Calculated—C, 58.74; H, 3.94; N, 11.75.<br>Developed color tone: Reddish-orange. |

* (n-Heptadecyl).

We claim:

1. A process for preparing a chromenopyrazol compound of claim 8, which comprises condensing in a condensation reaction medium a 2-(4′-N,N-disubstituted amino-2′-hydroxybenzoyl) benzoic acid having the formula:

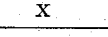

wherein $R_1$ and $R_2$ are as defined in claim 8, with a pyrazolone derivative represented by the formula:

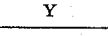

wherein X and Y are as defined in claim 8, said 2-(4′-N,N-disubstituted amino-2′-hydroxybenzoyl)benzoic acid and said pyrazolone derivative being present in said condensing reaction medium in equal molar amounts for 1 to 24 hours at 30° to 100° C., said condensation reaction medium being selected from the group consisting of sulfuric acid of above 60 percent in concentration and sulfuric acid and a member selected from the group consisting of phosphorous anhydride, polyphosphoric acid, anhydrous zinc chloride, phosphorous oxychloride, and fuming sulfuric acid.

2. The process of claim 1, wherein said 2-(4′-N,N-disubstituted amino-2′-hydroxybenzyl)benzoic acid is selected form the group consisting of 2-(4′N,N-diethylamino-2′-hydroxy-benzoyl)benzoic acid, 2-(4′-N,N-diamylamino-2′-hydroxybenzoyl) benzoic acid, 2-(4′-N,N-dimethylamino-2′-hydroxybenzoyl)benzoic acid, and 2-(4′-benzyl-N-methylamino-2′-hydroxybenzoyl)benzoic acid.

3. The process of claim 1 wherein said pyrazolone derivative is selected from the group consisting of 3-methyl-1-phenylpyrazolone, 3-methyl-1-(p-tolyl)pyrazolone, 3-ethoxy-1-(2′,4′,6′yl)pyrazolone, phenylpyrazolone, 3-(p-chlorobenzoyl)amino-1-phenylpyrazolone, 1,3-dimethylpyrazolone, 3-heptadecyl-1-(p-phenoxyphenyl)pyrazolone, 3-(m-nitrophenyl)-1-phenylpyrazolone, 3-methyl-1-(2′,6′-dichloro-4′-dichloro-4′-methoxyphenyl)pyrazolone.

4. A chromenopyrazol compound having the

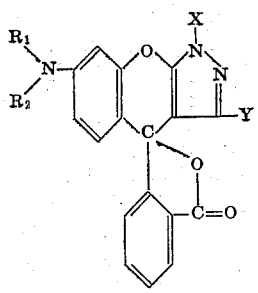

where each $R_1$ and $R_2$ is selected from the group consisting of alkyl of from one to five carbon atoms and benzyl, wherein X is selected from the group consisting of alkyl of one to five carbon atoms; phenyl; naphthyl; substituted phenyl, said substituents being selected from the group consisting of lower alkyl, halogen, nitro, lower alkoxyl and phenoxy; and substituted naphthyl said substituents being selected from the group consisting of lower alkyl, halogen, nitro and lower alkoxyl; and wherein Y is selected from the group consisting of alkyl of from one to 17 carbon atoms; alkoxyl of from one to five carbon atoms; phenyl; naphthyl; nitro phenyl, nitrosubstituted naphthyl, amino, p-chlorobenzoylamino, and m-nitrophenyl-carbamoylamino.

5. The compound of claim 4, wherein said $R_1$ and $R_2$ are methyl, X is phenyl, and Y is selected from the group consisting of methyl and nitrophenyl.

6. The compound according to claim 4, wherein said $R_1$ is ethyl, said $R_2$ is phenylethyl, X is phenyl, and Y is methyl.

7. The compound according to claim 4, wherein said $R_1$ and $R_2$ are ethyl, X is selected from the group consisting of methyl and methylphenyl, and Y is methyl.

8. The compound according to claim 4, wherein said $R_1$ and $R_2$ are ethyl, X is trichlorophenyl, and Y is selected from the group consisting of methyl and ethoxy.

9. The compound according to claim 4, wherein said $R_1$ and $R_2$ are ethyl, said X is phenyl, and said Y is selected from the group consisting of phenyl, amino, p-chlorobenzoylamino, and methyl.

10. The compound according to claim 4, wherein said $R_1$ and $R_2$ are ethyl, X is

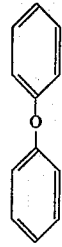

and Y is $C_{17}H_{35}$.

11. The compound according to claim 4, wherein said $R_1$ and $R_2$ are ethyl, X is

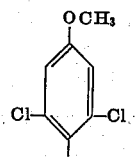

and Y is nitrophenylcarbamoylamino.

* * * * *